US009036690B2

(12) United States Patent  (10) Patent No.: US 9,036,690 B2
Aizawa  (45) Date of Patent: May 19, 2015

(54) FREQUENCY-DOMAIN EQUALIZING DEVICE AND RECEIVING DEVICE

(71) Applicant: Kabushiki Kaisha Toshiba, Tokyo (JP)

(72) Inventor: Masami Aizawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/785,975

(22) Filed: Mar. 5, 2013

(65) Prior Publication Data

US 2013/0272365 A1  Oct. 17, 2013

(30) Foreign Application Priority Data

Mar. 27, 2012 (JP) ................. 2012-071782

(51) Int. Cl.
  *H03K 5/159* (2006.01)
  *H04L 25/03* (2006.01)
  *H03H 7/30* (2006.01)
  *H03H 7/40* (2006.01)

(52) U.S. Cl.
  CPC .... *H04L 25/03955* (2013.01); *H04L 25/03159* (2013.01)

(58) Field of Classification Search
  CPC ................. H04L 25/03038; H04L 25/03057; H04L 27/2647; H04L 2025/0349; H04L 2025/03617; H04N 5/4401
  USPC .................................. 375/229, 232, 233, 316
  See application file for complete search history.

(56) References Cited

U.S. PATENT DOCUMENTS

| 7,043,680 | B2 | 5/2006 | Aizawa |
| 2003/0007554 | A1* | 1/2003 | Birru ............................. 375/233 |
| 2006/0209974 | A1 | 9/2006 | Yoshida |
| 2007/0064824 | A1* | 3/2007 | Wang et al. ................... 375/260 |
| 2008/0291990 | A1 | 11/2008 | Yoshida et al. |
| 2011/0268169 | A1* | 11/2011 | Mitsugi et al. ................ 375/226 |

FOREIGN PATENT DOCUMENTS

| JP | H05-114895 A | 5/1993 |
| JP | 2000-049689 | 2/2000 |
| JP | 2000-306459 | 11/2000 |
| JP | 2002-094484 A | 3/2002 |
| JP | 2004-120789 | 4/2004 |
| JP | 2004-328440 A | 11/2004 |
| JP | 2002-118533 A | 10/2006 |
| JP | 2011-234223 A | 11/2011 |

OTHER PUBLICATIONS

Japanese Office Action, Patent Application No. 2012-071782, dated Jun. 24, 2014.

* cited by examiner

*Primary Examiner* — Ted Wang
(74) *Attorney, Agent, or Firm* — Patterson & Sheridan, LLP (57) ABSTRACT

A frequency domain-equalizing device receives a digitally modulated single-carrier signal and carries out multipath equalization in a frequency domain. This frequency domain-equalizing device includes a frequency domain-conversion module, a transmission path response-estimation module, an equalization module, an interference decision module, a correction module, and a time-domain conversion module. The interference decision module determines whether at least some portion of a signal is interference and the correction module corrects the signal according to the determination of the interference decision module.

15 Claims, 8 Drawing Sheets

FREQUENCY-DOMAIN EQUALIZING DEVICE AND RECEIVING DEVICE

CROSS-REFERENCE TO RELATED APPLICATION

This application is based upon and claims the benefit of priority from Japanese Patent Application No. 2012-071782, filed Mar. 27, 2012, the entire contents of which are incorporated herein by reference.

FIELD

Embodiments described herein relate to a frequency-domain equalizing device and a receiving device.

BACKGROUND

In radio communications, multipath interference due to reflection of signal waves is a big problem; however, linear equalizers can be used in a technique to suppress multipath interference. Recently, an equalization technique for broadband single-carrier communications that blocks several transmitting signals and equalizes their time signal in a frequency domain (hereinafter, FDE: frequency-domain equalization) has been proposed in the art. In FDE, on the transmission side, a guard interval (hereafter, GI: guard interval) of known signals such as a PRBS (Pseudo Random Bit Sequence) (referred to hereinafter as a "PN series") is added to the lead of n pieces of blocked data signal (n symbols). These GI and n pieces of data signals constitute a frame. On the reception side, after the GI is removed from the reception frame, a data block portion is converted into a frequency domain. Next, a transmission path response in a time domain is estimated utilizing the PN series and converted into a frequency domain, and the data block portion is equalized utilizing the transmission-path response in the frequency domain.

An equalizing device for an equalizing process is provided with a first frequency domain-conversion module, a transmission path response-estimation module, an equalization module, and a time domain-conversion module. Of these parts, the first frequency domain-conversion module converts a time-domain signal in which the GI has been removed from a received signal into a frequency-domain signal. The transmission path response-estimation module includes a correlation-processing module, a PN-series generation module, and a second frequency domain-conversion module. Of these parts, the correlation-processing module calculates an estimated transmission path-response value of a time domain through correlation processing of the received signal and a PN series generated in the PN series-generation module. Next, the second frequency domain-conversion module converts the estimated transmission path-response value of the time domain into an estimated transmission path-response value of a frequency domain and outputs the estimated transmission path-response value of the frequency domain to the equalization module. The equalization module equalizes the frequency-domain signal from which the GI has been removed using the estimated transmission path-response value of the frequency domain and outputs the equalized output to the time domain-conversion module. The time domain-conversion module converts the equalized signal from the equalization module into a time domain and outputs the signal into a demodulated single-carrier signal.

In contrast, in broadcast-receiving devices in each country including Japan, when analog interference signals are received, a specification (performance) to which these signals must be able to be received up to a certain value (dB) of the D/U ratio is determined in many cases.

Therefore, even in receiving devices of single-carrier transmission, etc., it is necessary to verify effective decisions and the removal of interference signals with high frequency dependency such as interference from analog TV signals.

DETAILED DESCRIPTION

Embodiments provide a frequency domain-equalizing device and a receiving device that can determine what portion of a received single-carrier signal is interference and then remove the interference signals with high frequency dependency, such as analog TV signals.

In general, a detailed description according to one embodiment of the present disclosure will be explained with reference to the figures.

In a frequency domain-equalizing device that receives a digitally modulated single-carrier signal and carries out multipath equalization in a frequency domain, the frequency domain-equalizing device includes a frequency domain-conversion module for converting a received time-domain signal into a frequency-domain signal, a transmission path response-estimation module for estimating the transmission path response in the frequency domain from the received signal, an equalization module for equalizing the output of the frequency domain-conversion module using the output of the transmission path response-estimation module, an interference decision module for determining whether at least a portion of an equalized signal output from the equalization module is interference and to output a decision result, a correction module for correcting the output of the equalization module based on the decision result, and a time domain-conversion module for converting the frequency-domain signal output from the correction module into a time-domain signal. Signals that are interference in the frequency domain are thereby detected and corrected.

The interference decision module can include an integration module for integrating the output of the equalization module at each frequency unit over a prescribed number of frames and a decision module for deciding whether the size of the output of the integration module exceeds a threshold value.

First Embodiment

Figure 1A:
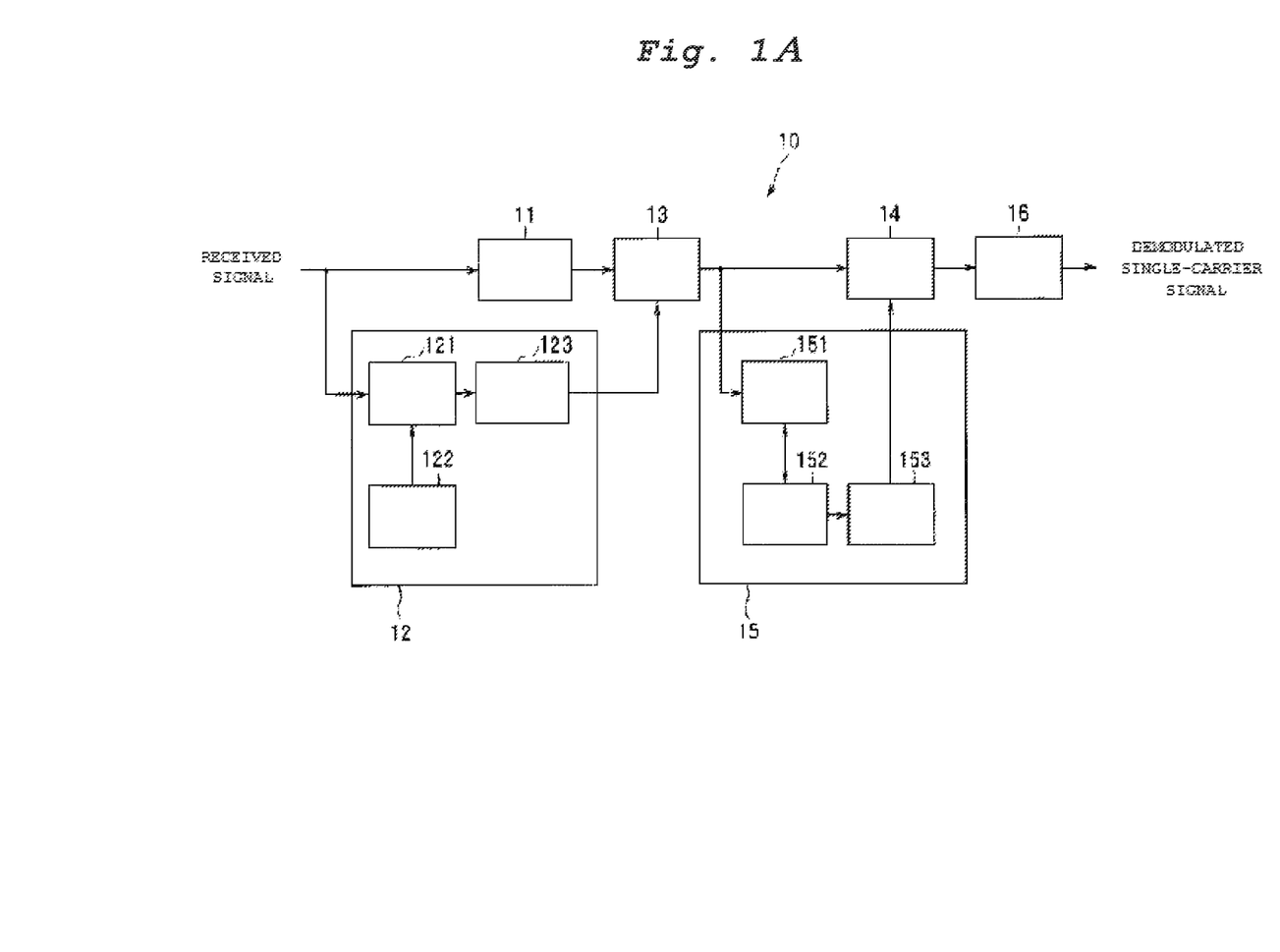
FIG. 1A is a block diagram depicting a frequency domain-equalizing device according to a first embodiment.
Figure 2:
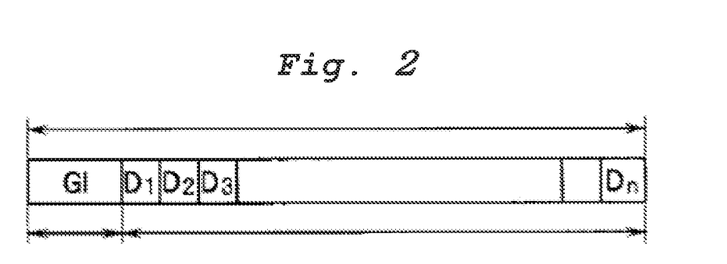
FIG. 2 shows a frame constitution (time-domain signal) that is used in frequency-domain equalization.

FIG. 1A is a block diagram showing the frequency domain-equalizing device of the first embodiment, and FIG. 2 shows a frame constitution (time-domain signal) that is used in frequency-domain equalization.

First, the frame constitution of FIG. 2 will be explained. In the frequency-domain equalization (FDE) technique, on the transmission side, as shown in FIG. 2, a guard interval (GI), such as a PN series, with a known pattern is added to the lead of a blocked data signal (n blocks in length) and transmitted. Hereinafter, this unit is called a frame. The GI is sometimes called a frame header (FH), and the data block portion is sometimes called a frame body (FB). On the reception side, after removing the GI from the received frame, the data block portion is converted into a frequency domain. Next, utilizing the known PN series, a transmission path response in a time domain is estimated then converted into a frequency domain. The data block portion is then equalized utilizing the transmission path response in the frequency domain.

A frequency domain-equalizing device 10 shown in FIG. 1A receives a digitally modulated single-carrier signal and carries out multipath equalization in a frequency domain. This frequency domain-equalizing device has the function of deciding and correcting interference signals in the frequency domain.

The frequency domain-equalizing device 10 is provided with a first frequency-domain conversion module 11, a transmission path response-estimation module 12, an equalization module 13, a correction module 14, an interference decision module 15, and a time-domain conversion module 16.

The frequency domain-conversion module 11 converts a received time-domain signal from which the GI has been removed into a frequency-domain signal. The frequency domain-conversion module 11 outputs the frequency-domain signal (R(k): k=1, 2, 3, ... and n) to the equalization module 13.

The transmission path-response estimation module 12 estimates a transmission-path response in the frequency domain from the received signal. The transmission path response-estimation module 12 includes a correlation-processing module 121, a PN series-generation module 122, and a second frequency domain-conversion module 123.

The PN series generation module 122 generates the same PN series as used on the transmission side and outputs the PN series to the correlation-processing module 121.

The correlation-processing module 121 calculates an estimated transmission path-response value in a time domain through correlation processing of the received signal and the PN series. The correlation-processing module 121 outputs the calculated estimated transmission path-response value to the frequency domain-conversion module 123.

The frequency domain-conversion module 123 converts the estimated transmission-path response value in the time domain into an estimated transmission-path response value in the frequency domain and outputs the estimated transmission-path response value in the frequency domain to the equalization module 13.

The equalization module 13 equalizes the output of the frequency domain-conversion module 11 with the output of the transmission path response-estimation module 12. In other words, the equalization module 13 equalizes the frequency-domain signal of the received signal by using the estimated transmission-path response value in the frequency domain and outputs the equalized output to the interference-decision module 15 and the correction module 14.

The interference-decision module 15 includes an integration module 151, a memory 152, and a decision module 153.

The integration module 151 integrates the equalized output from the equalization module 13 using the memory 152. The output of the equalization module 13 is integrated over a prescribed number of frames for each frequency unit. In other words, the integration module 151 integrates the inputted equalized data at each frequency unit, and writes the integrated data at each frequency unit to the memory 152, outputs the result and stores the result integrated over the prescribed number of frames in the memory 152. The integration module 151 can also read out data from the memory 152 as needed.

The decision module 153 determines whether the magnitude of the output of from integration module 151 exceeds a preset threshold. In other words, the integration result from the integration module 151 is compared with the prescribed threshold, and if the integration result is greater than the threshold, then the result is designated as interference, and the interference decision result is then output to the correction module 14.

The correction module 14 corrects the output of the equalization module 13 based on the decision result from the decision module 153 in the interference-decision module 15. In other words, if the equalized output exceeds the threshold of the decision module 153, the output is regarded as an interference portion, and the output of the equalization module 13 is corrected and output to the time domain-conversion module 16.

Here, correction means the lessening or removal of a power level of a signal portion determined as interference. In actuality, the portion regarded as the interference is generally removed (that is, 0 processing) in most cases. The reason for this removal function is that, even if some usable portion of the signal is removed as interference, because it is only a very small portion of the frequency domain and the removed portion is entirely leveled when it is converted into the time domain by the time domain conversion-module at the latter stage, there is no significant influence on the final result.

Figure 3A:
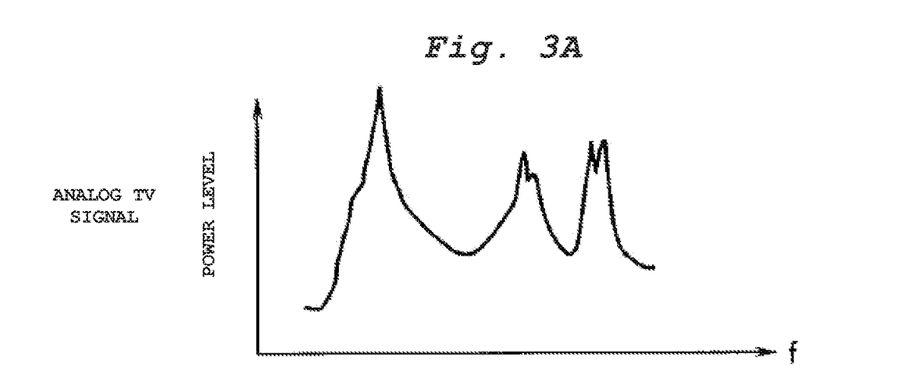
FIGS. 3A and 3B are state diagrams depicting the frequency characteristics of a received digital TV signal and the frequency characteristics of a received analog TV signal that has influence as an interference signal on the digital signal.
Figure 3B:
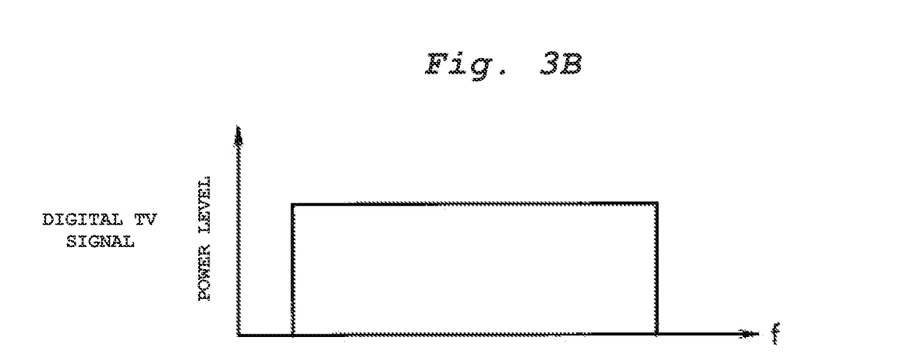

FIGS. 3A and 3B show the comparison of the characteristics of a frequency-domain component of an analog TV signal as an example of possible interference and the characteristics of a frequency-domain component of a digital TV signal. FIG. 3A shows the characteristics of the frequency domain component of the analog TV signal, and FIG. 3B shows the flat characteristics of the frequency-domain component of the digital TV signal. The analog TV signal or other spurious waves (unnecessary waves other than the desired waves) have high frequency selectivity and can be an interference signal to digital TV signals such as digital broadcasting, and even if an excessive signal component is removed from the frequency domain, the interference ratio to the digital TV signal can be reduced.

Figure 4:
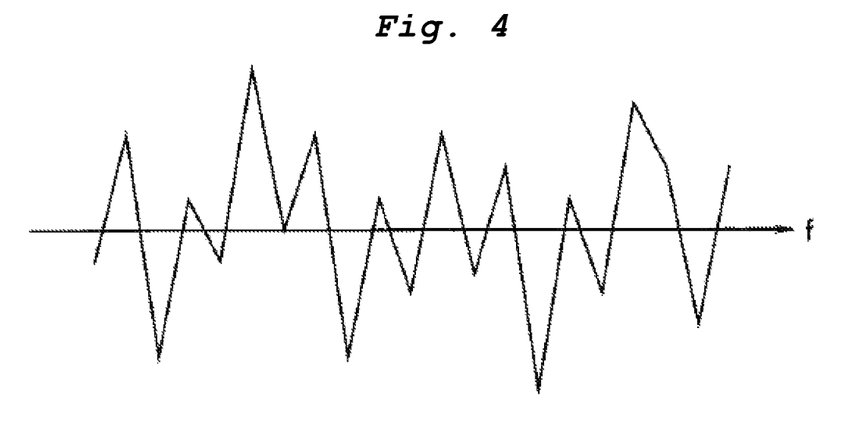
FIG. 4 is a state diagram depicting a frequency-domain signal of a received single-carrier signal.
Figure 5:
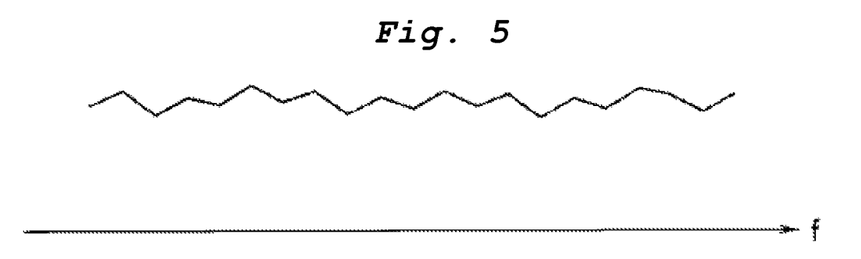
FIG. 5 is a state diagram depicting averaging of the frequency-domain signal.

Next, averaging processing of a power level will be explained with reference to FIG. 4 and FIG. 5. FIG. 4 is a state diagram showing the frequency-domain signal of a received single-carrier signal, and FIG. 5 is a state diagram showing averaging of the frequency-domain signal. In FIG. 4 and FIG. 5, the abscissa (x-axis) indicates the frequency f, and the ordinate (y-axis) indicates the power level.

For a received signal from a single carrier, a frequency-domain signal output by the first frequency domain-conversion module 11, as shown in FIG. 4, is a random signal based on the frequency axis depending upon an input signal.

In this state, even if an interference signal is mixed, the interference signal and the original transmitted signal cannot be discriminated between because of the randomness of the transmitting signal itself.

Accordingly, if the input is sufficiently random on the time axis and in the case that only the transmitting-signal component is considered, a fixed power is attained by sufficiently averaging the transmitting-signal component even in the frequency-axis domain. In addition, because the interference signal component is additively independent on the frequency axis, it can be expressed by the sum of the fixed power and the interference signal. For interference waves sufficiently larger than the transmitting signal component, it is sufficient to correct the frequency-axis domain when the power level exceeds a set threshold.

Figure 6:
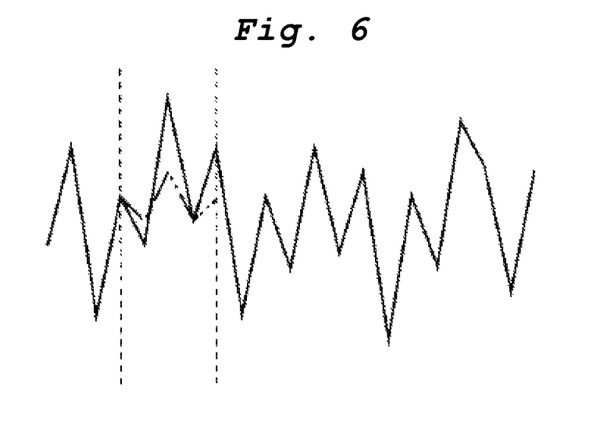
FIG. 6 relates to an example of a method for correcting a portion of the received single-carrier signal.
Figure 7:
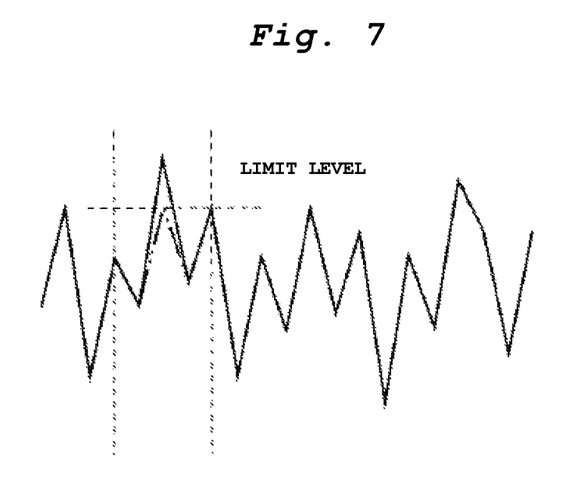
FIG. 7 relates to an example of a method for correcting a portion of the received single-carrier signal.
Figure 8:
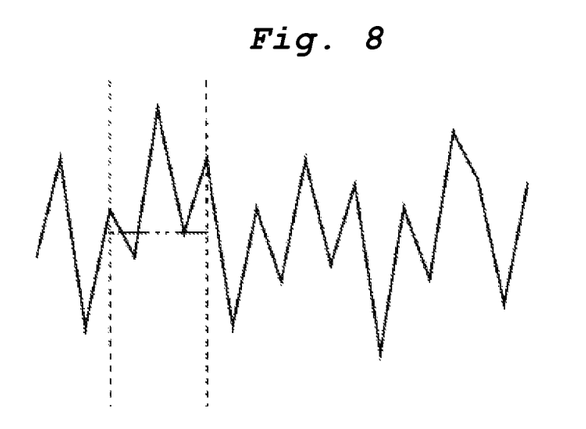
FIG. 8 relates to an example of a method for correcting a portion of the received single-carrier signal.

For the correction method, for example, the methods are shown in FIG. 6 to FIG. 8.

FIG. 6 shows a method that reduces the amplitude by multiplying an integer term of 1.0 or smaller by the data corresponding to the correction processing. The corrected portion is indicated with alternating long and two short dashed lines.

FIG. 7 shows a method that limits the data corresponding to the correction processing to a certain value or less. The data are limited to the limit level of the dotted line and lowered to the level of the alternating long and two short dashed lines.

FIG. 8 shows a method that masks ("zeros") data corresponding to the correction processing, this method may be referred to as "zeroing." In other words, the power level is processed to 0 as indicated by the alternating long and two short dashed lines. Other correction methods can also be used and are contemplated in combination with, or instead of, those already mentioned.

Figure 9:
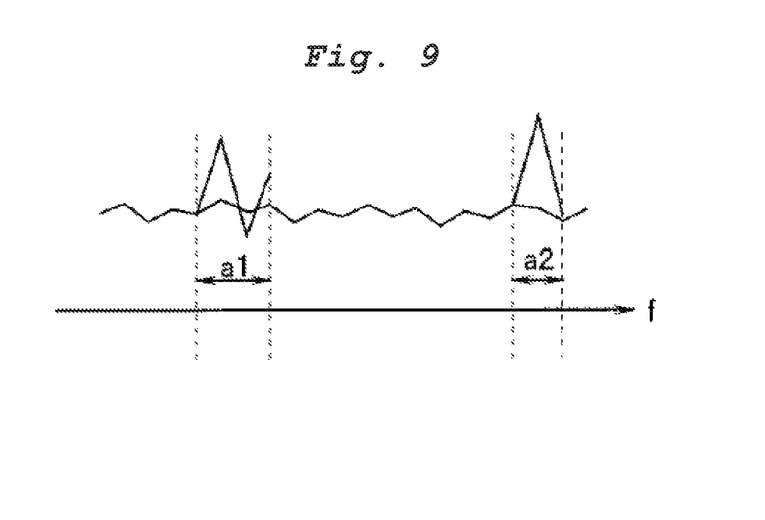
FIG. 9 relates to an example of a decision range for interference decisions within a specific frequency domain.

As mentioned above, because the analog TV signal in the frequency domain shown in FIGS. 3A and 3B has high frequency selectivity, even if an excessive signal component is only removed in the frequency domain, the interference ratio of the analog signal to the digital TV signal can be lowered. In this case, as shown in FIG. 9, to avoid a wrong operation due to multiple paths, etc., only the signal components of specific frequency domains shown as interference decision ranges a1, a2 are corrected and thus a more robust system is realized. Additional interference decision ranges may also be corrected.

As shown in FIG. 5, averaging processing on the frequency axis is carried out. However, the power is not fixed in accordance with the type of transmitting signal or the amount of averaging (the size of the frequency-axis domain for the averaging processing) when the amount of correction (the amount of loss) that is lost by the correction exceeds a set amount. These cases are regarded as certain abnormal states.

In other words, an error correction module not shown in the figure is arranged at the latter stage of the time-domain conversion module 16 to handle these abnormal states. However, in the case that the amount of correction (the amount of loss) in the correction module 14 is larger than the original error correctability of the error-correction module because an error correction in the error-correction module is not appropriately operated, it is effective to reduce the amount of correction in the correction module when the amount of correction (the amount of loss) is too large.

Figure 1B:
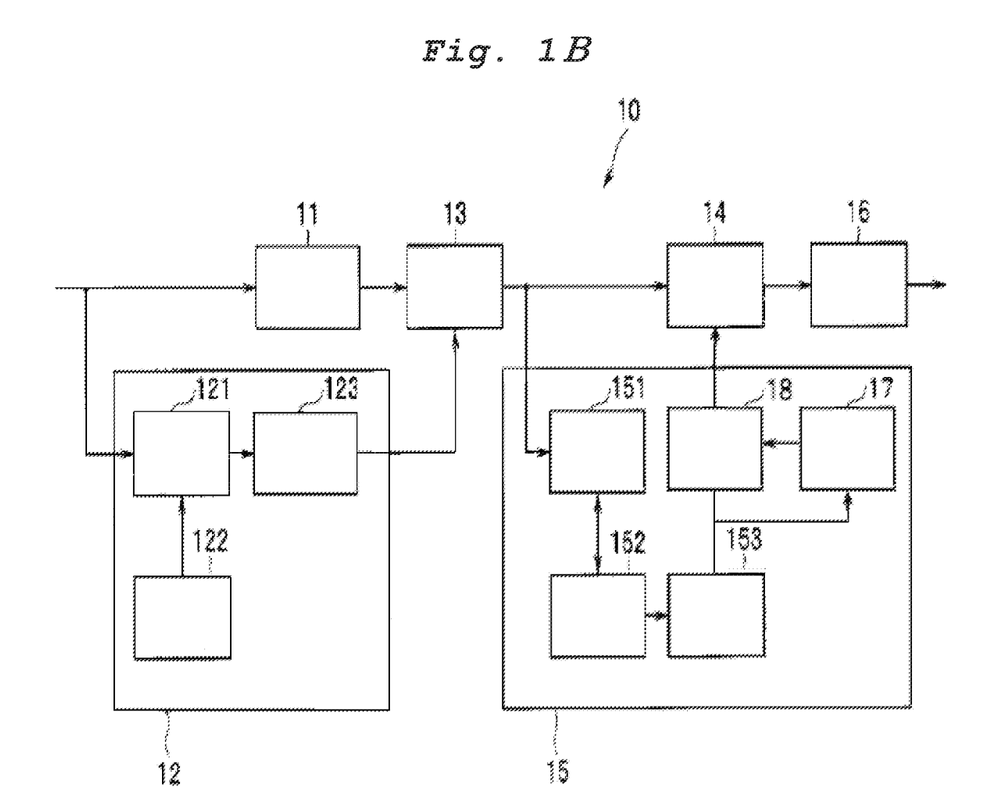
FIG. 1B is a block diagram depicting a frequency domain-equalizing device according to an example modification of the first embodiment.

Specifically, at the latter stage of the correction module 14 (for example, between the correction module 14 and the time domain-conversion module 16), a detection module 17 (as, for example, depicted in FIG. 1B) for detecting the amount of correction of the correction module 14 and a control module 18 (as, for example, depicted in FIG. 1B) for reducing the amount of correction when the amount of correction detected in the detection module exceeds a preset amount may be further included.

Figure 10:
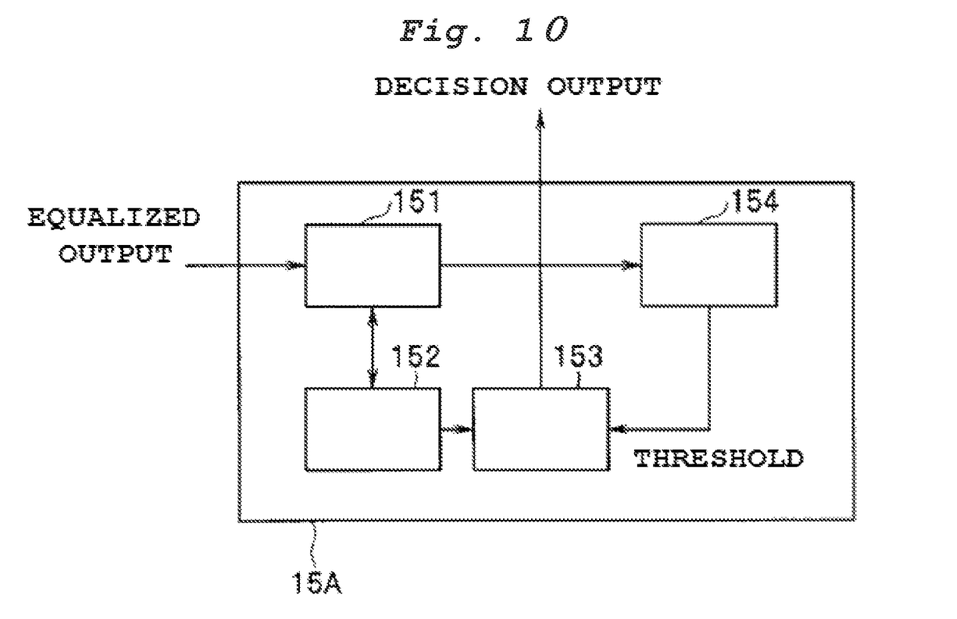
FIG. 10 is a block diagram depicting another application example of an interference decision module in a frequency domain-equalizing device.
Figure 11:
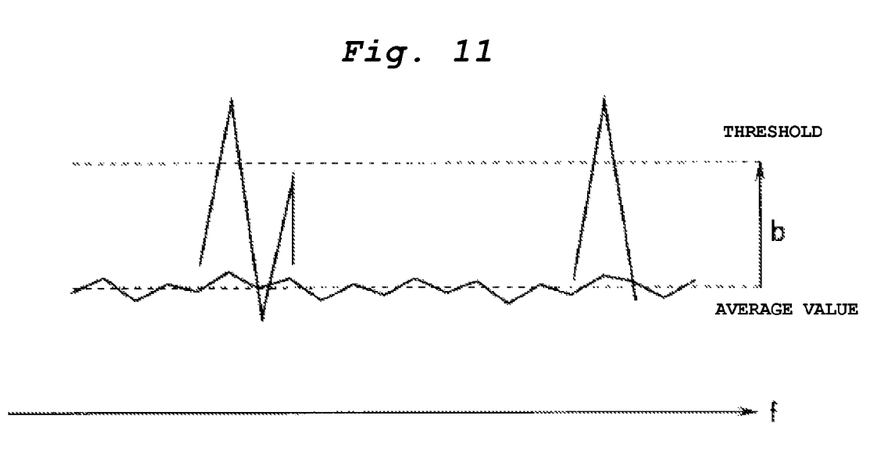
FIG. 11 relates to an example of an interference decision operation.

FIG. 10 is a block diagram showing another example of the interference decision module in the frequency domain-equalizing device of FIG. 1A. FIG. 11 illustrates an example of the interference-decision operation that uses the module (15A) depicted in FIG. 10.

An interference-decision module 15A shown in FIG. 10 includes an integration module 151, a memory 152, a decision module 153, and an averaging module 154.

The interference-decision module 15A is composed such that the averaging module 154 calculates an average value within one frame of the output of the integration module 151 and sets a value at which a preset value b is added to the average value as a threshold of the decision module 153, and this value is included in the interference-decision module 15 of FIG. 1A.

As shown in FIG. 11, in the averaging module 154 the average value of the signal power within one frame is calculated. Next, a threshold is set to a level higher than the average value by the preset value b, and thus it is possible to decide that a specific portion on the frequency axis is interference, even if the level of the entire receiving signal varies.

According to the first embodiment, the frequency domain-equalizing device, which can effectively decide and remove interference signals with high frequency dependency such as analog TV signals when a single-carrier signal is received, can be realized.

Second Embodiment

Figure 12:
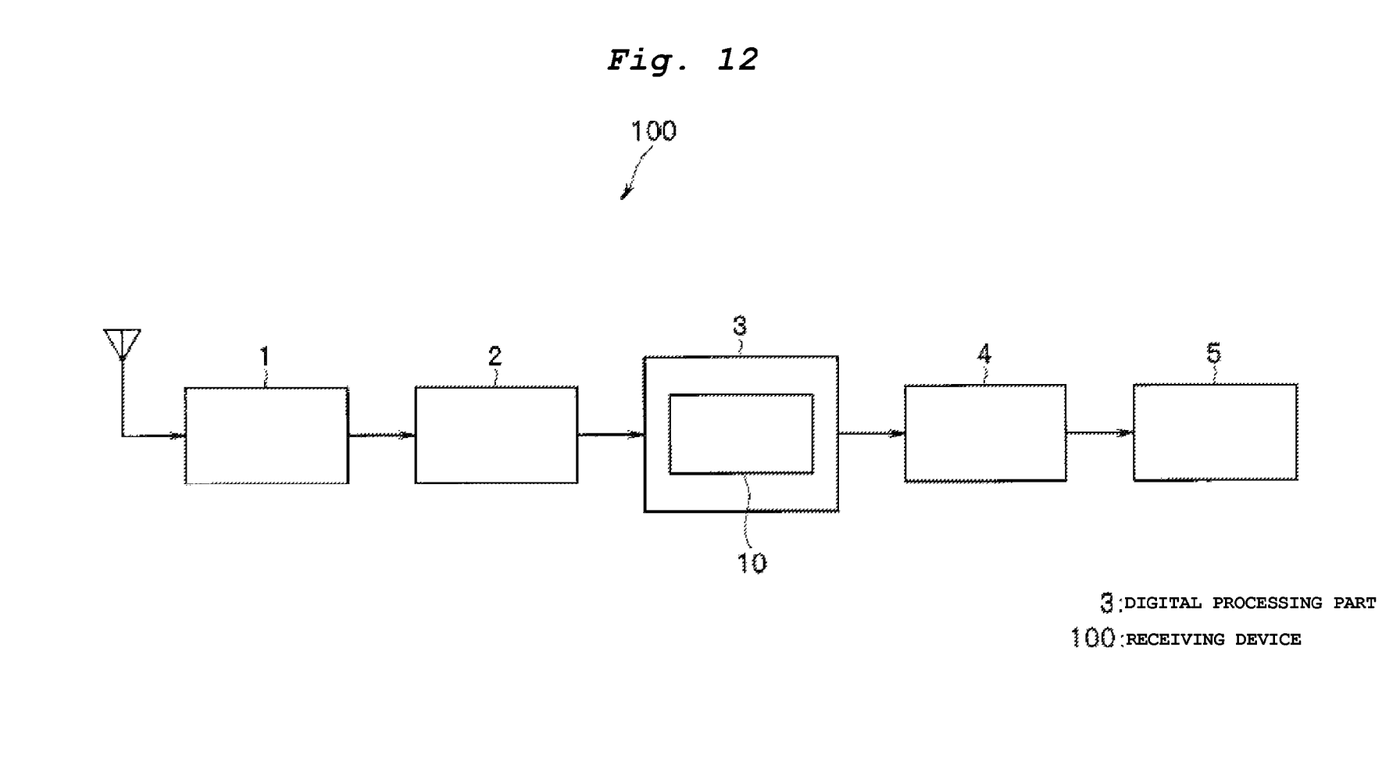
FIG. 12 is a block diagram depicting the receiving device of a second embodiment.

FIG. 12 is a block diagram depicting a receiving device of a second embodiment. In the FIG. 12, a receiving device in which the frequency domain-equalizing device of the first embodiment is mounted is depicted.

A receiving device 100 of the embodiment of FIG. 12 is provided with a tuner 1 for channel-selecting and receiving a communication signal, an orthogonal demodulation module 2 that converts the receiving signal from the tuner 1 into a digital signal and also converts the signal into a base band, a digital module 3 that includes the frequency domain-equalizing device 10 of the first embodiment, which equalizes the signal from the orthogonal demodulation module 2 and demodulates and outputs the equalized data, a decoder 4 that decodes the demodulated data and reproduces a video signal and an audio signal, and a display unit 5 that displays the reproduced video signal and outputs an audio signal.

According to the second embodiment, a receiving device, which can effectively determine and remove interference signals with high frequency dependency such as analog TV signals when a single-carrier signal is received, can be realized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A frequency domain-equalizing device, comprising:
a frequency domain-conversion module configured to convert a received time-domain signal into a frequency-domain signal;
a transmission path response-estimation module configured to estimate a frequency-domain transmission-path response from the received time-domain input signal;
an equalization module configured to equalize the frequency-domain signal using the frequency-domain transmission-path response;
an interference decision module configured to determine whether a portion of an equalized signal output from the equalization module is interference and to output a decision result indicating whether the portion is interference, the interference decision module including an integration module configured to integrate the equalized signal over a prescribed number of frames for each frequency unit of the frequency-domain signal and
a decision module configured to output the decision result, the decision result indicating whether a magnitude of an output of the integration module exceeds a threshold value;
a correction module configured to correct the equalized signal according to the decision result; and
a time domain-conversion module configured to convert a corrected frequency-domain signal output from the correction module into a time-domain output signal.

2. The frequency domain-equalizing device of claim 1, wherein the interference decision module further includes:
an averaging module configured to calculate an average power level value of the frequency-domain signal and supply the average power level value to the decision module.

3. The frequency domain-equalizing device of claim 2, wherein the threshold value is varied according to the average power level value.

4. The frequency domain-equalizing device of claim 1, wherein the portion of the equalized signal is a specific frequency range.

5. The frequency domain-equalizing device of claim 1, further comprising:
a detection module configured to detect an amount of correction applied by the correction module; and
a control module configured to reduce the amount of correction applied by the correction module when the amount exceeds a predetermined amount.

6. The frequency domain-equalizing device of claim 1, wherein the received time-domain signal comprises a frame including a frame header and one or more data blocks, and the frame header is used for estimating a transmission path response in the time-domain.

7. The frequency domain-equalizing device of claim 6, wherein the frame header includes a PN series.

8. The frequency domain-equalizing device of claim 7, wherein transmission path response-estimation module includes:
a PN series generator configured to generate a PN series that matches the PN series included in the frame header;
a correlation processing module configured to estimate a time-domain transmission path response by correlating the frame header and the PN series generated by the PN series generator; and
a second frequency-domain conversion module configured to convert the time-domain transmission path response to the frequency domain.

9. The frequency domain-equalizing device of claim 8, further comprising:
a detection module configured to detect an amount of correction applied by the correction module; and
a control module configured to reduce the amount of correction applied by the correction module when the amount exceeds a predetermined amount.

10. A receiving device, comprising:
a tuner configured to select channels and to receive a communication signal;
an orthogonal demodulation module configured to convert the received communication signal into a digital signal;
a digital processing module that includes:
a frequency domain-conversion module configured to convert a time-domain signal into a frequency-domain signal;
a transmission path response-estimation module configured to estimate a frequency-domain transmission-path response from the time-domain signal;
an equalization module configured to equalize the frequency-domain signal using the frequency-domain transmission-path response;
an interference decision module configured to determine whether a portion of an equalized signal output from the equalization module is interference and to output a decision result indicating whether the portion is interference;
a correction module configured to correct the equalized signal according to the decision result; and
a time domain-conversion module configured to convert a corrected frequency-domain signal output from the correction module into a time-domain output signal;
a decoder module configured to decode a demodulated signal output from the digital processing module; and
a display unit configured to display a decoded signal output from the decoder module.

11. The receiving device of claim 10, wherein the orthogonal demodulation module is configured to convert the communication signal into a baseband.

12. A method of receiving a digitally modulated single-carrier signal comprising:
receiving a signal comprising a frame of digitally modulated data including a frame header;
estimating a transmission path response for a received signal by using the frame header;
converting the transmission path response from a time-domain to a frequency domain;
converting the received signal from the time-domain to the frequency-domain;
equalizing a converted received signal using a converted transmission path response to provide an equalized signal;
determining whether a portion of the equalized signal is interference, said determining comprising:
integrating the equalized signal over a prescribed number of frames to provide an integration result; and
comparing a magnitude of the integration result to a prescribed threshold value;
correcting the equalized signal when the portion is determined to be interference; and converting a corrected equalized signal from the frequency-domain to the time-domain.

13. The method of claim 12, wherein determining whether a portion of the equalized signal is interference further includes:

calculating an average value of a power level within the frame.

14. The method of claim 12, wherein correcting the equalized signal includes averaging the portion of the equalized signal.

15. The method of claim 12, wherein correcting the equalized signal includes zeroing the portion of the equalized signal.

\* \* \* \* \*